(12) United States Patent
Olaiya et al.

(10) Patent No.: US 8,676,031 B1
(45) Date of Patent: *Mar. 18, 2014

(54) LOCALITY-BASED VIDEO PLAYBACK TO ENABLE LOCALLY RELEVANT PRODUCT PLACEMENT ADVERTISING

(75) Inventors: Oladipupo Olaiya, Morrisville, NC (US); Thomas A. Roberts, Fuquay-Varina, NC (US); James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 299 days.

This patent is subject to a terminal disclaimer.

(21) Appl. No.: 13/187,774

(22) Filed: Jul. 21, 2011

Related U.S. Application Data (63) Continuation of application No. 11/611,181, filed on Dec. 15, 2006, now Pat. No. 7,991,269.

(51) Int. Cl.
   *H04N 5/92* (2006.01)
   *H04N 5/93* (2006.01)

(52) U.S. Cl.
   USPC ............................... 386/248; 386/239

(58) Field of Classification Search
   USPC ................... 386/239, 248, 249, 250, 262, 341
   See application file for complete search history.

(56) References Cited

U.S. PATENT DOCUMENTS

| | | | |
|---|---|---|---|
| 6,128,651 A | 10/2000 | Cezar | |
| 6,161,127 A | 12/2000 | Cezar et al. | |
| 6,584,492 B1 | 6/2003 | Cezar et al. | |
| 7,039,932 B2 | 5/2006 | Eldering | |
| 7,116,342 B2 | 10/2006 | Dengler et al. | |
| 7,451,467 B2 | 11/2008 | Carver et al. | |
| 7,565,450 B2 | 7/2009 | Garcia-Luna-Aceves et al. | |
| 7,600,037 B2 | 10/2009 | Tucker | |
| 7,650,617 B2 | 1/2010 | Hoshino et al. | |
| 7,652,594 B2 | 1/2010 | Lamont et al. | |
| 7,991,269 B1 * | 8/2011 | Olaiya et al. ................. | 386/248 |
| 2001/0034763 A1 | 10/2001 | Jacobs et al. | |
| 2002/0007413 A1 | 1/2002 | Garcia-Luna-Aceves et al. | |
| 2002/0095454 A1 | 7/2002 | Reed et al. | |
| 2002/0138291 A1 | 9/2002 | Vaidyanathan et al. | |
| 2002/0138440 A1 | 9/2002 | Vaidyanathan et al. | |

(Continued)

FOREIGN PATENT DOCUMENTS

| | | |
|---|---|---|
| EP | 1162840 A2 | 12/2001 |
| EP | 1524602 A2 | 4/2005 |

(Continued)

OTHER PUBLICATIONS

Advertisement Bidding System and Method, http://www.priorartdatabase.corn/IPCOM/000138556. 2 pages.

(Continued)

*Primary Examiner* — Robert Chevalier
(74) *Attorney, Agent, or Firm* — Withrow & Terranova, PLLC (57) ABSTRACT

A system and method are disclosed for providing a digital medium, such as a Digital Video Disc (DVD), enabling playback of different versions of a media presentation depending on the locality of the viewer, where each version includes embedded advertisements for a corresponding locality. In one embodiment, a DVD stores a media presentation such as, for example, a movie, an episode of a television program, or the like. Depending on the location of the viewer, the DVD provides a version of the media presentation having embedded advertisements relevant to the locality of the viewer.

17 Claims, 4 Drawing Sheets

(56) References Cited

U.S. PATENT DOCUMENTS

| | | | |
|---|---|---|---|
| 2002/0184403 | A1 | 12/2002 | Dahlin et al. |
| 2003/0004793 | A1 | 1/2003 | Feuer et al. |
| 2004/0003398 | A1 | 1/2004 | Donian et al. |
| 2004/0100556 | A1 | 5/2004 | Stromme |
| 2005/0091160 | A1 | 4/2005 | Kitze et al. |
| 2005/0097183 | A1 | 5/2005 | Westrelin |
| 2005/0289588 | A1 | 12/2005 | Kinnear |
| 2006/0010466 | A1 | 1/2006 | Swix et al. |
| 2006/0036490 | A1 | 2/2006 | Sagalyn |
| 2006/0075057 | A1 | 4/2006 | Gildea et al. |
| 2006/0095507 | A1 | 5/2006 | Watson |
| 2006/0110552 | A1 | 5/2006 | Ishida et al. |
| 2006/0212900 | A1 | 9/2006 | Ismail et al. |
| 2006/0294555 | A1 | 12/2006 | Xie |
| 2007/0219949 | A1 | 9/2007 | Mekikian |
| 2008/0140481 | A1 | 6/2008 | Gold |

FOREIGN PATENT DOCUMENTS

| | | | |
|---|---|---|---|
| EP | 1528478 | A1 | 5/2005 |
| WO | 9905584 | A2 | 2/1999 |
| WO | 0171524 | A1 | 9/2001 |
| WO | 0245430 | A2 | 6/2002 |

OTHER PUBLICATIONS

Gwertzman et al., "An Analysis of Geographical Push-Caching," in Proceedings of the 5th IEEE Workshop on Hot Topics in Operating Systems, pp. 51-55, Orcas Island, WA, May 1995. 20 pages.

Internet Cache Protocol, http://en.wikipedia.org/wiki/Internet_Cache_Protocol. 2 pages.

Recto, R. et al., "An RDMA Protocol Specification (Version 1.0)", Oct. 2002, http://www.rdmaconsortium.org/home/draft-recio-iwarp-rdmap-v1.0.pdf. 60 pages.

SnapStream:PC DVR and TV tuner software, http://www.snapstream.com. 1 page.

Squid Cache, http://en.wikipedia.org/wiki/Squid_cache. 3 pages.

Unknown Author, "Marathon Ventures Brand Integration," (website) obtained Feb. 8, 2007, 1 page, http://www.marathonventures.com/dbi_slide_show.html.

Notice of Allowance mailed Mar. 22, 2011 issued by the Patent Office during the prosecution of U.S. Appl. No. 11/611,181. 13 pages.

Non-Final Rejection mailed Nov. 19, 2010 issued by the Patent Office during the prosecution of U.S. Appl. No. 11/611,181. 17 pages.

Examiner's Answer to Appeal Brief mailed Jul. 19, 2011 issued by the Patent Office during the prosecution of U.S. Appl. No. 11/762,366. 18 pages.

Final Rejection mailed Dec. 1, 2010 issued by the Patent Office during the prosecution of U.S. Appl. No. 11/762,366. 23 pages.

Non-Final Rejection mailed Jul. 14, 2010 issued by the Patent Office during the prosecution of U.S. Appl. No. 11/762,366. 40 pages.

* cited by examiner

FIG. 1

| PGC A | 20-1 CELL 1 | 20-2 CELL 2A | 20-3 CELL 3 | 20-4 CELL 4A | 20-5 CELL 5 | 20-6 CELL 6A | 20-7 CELL 7 |
|---|---|---|---|---|---|---|---|
| PGC B | 22-1 CELL 1 | 22-2 CELL 2B | 22-3 CELL 3 | 22-4 CELL 4B | 22-5 CELL 5 | 22-6 CELL 6B | 22-7 CELL 7 |
| PGC C | 24-1 CELL 1 | 24-2 CELL 2C | 24-3 CELL 3 | 24-4 CELL 4C | 24-5 CELL 5 | 24-6 CELL 6C | 24-7 CELL 7 |
| PGC D | 26-1 CELL 1 | 26-2 CELL 2D | 26-3 CELL 3 | 26-4 CELL 4D | 26-5 CELL 5 | 26-6 CELL 6D | 26-7 CELL 7 |
| PGC E | 28-1 CELL 1 | 28-2 CELL 2E | 28-3 CELL 3 | 28-4 CELL 4E | 28-5 CELL 5 | 28-6 CELL 6E | 28-7 CELL 7 |
| PGC_DEF | 30-1 CELL 1 | 30-2 CELL 2_DEF | 30-3 CELL 3 | 30-4 CELL 4_DEF | 30-5 CELL 5 | 30-6 CELL 6_DEF | 30-7 CELL 7 |

LOCALITY-BASED VIDEO PLAYBACK TO ENABLE LOCALLY RELEVANT PRODUCT PLACEMENT ADVERTISING

CROSS-REFERENCE TO RELATED APPLICATION

The present application is a continuation of U.S. patent application Ser. No. 11/611,181, filed Dec. 15, 2006, entitled "LOCALITY-BASED VIDEO PLAYBACK TO ENABLE LOCALLY RELEVANT PRODUCT PLACEMENT ADVERTISING," which is hereby incorporated herein by reference in its entirety.

FIELD OF THE INVENTION

The present invention relates to embedding advertisements in a media presentation such as a movie, and more particularly relates to enabling locality-based product placement advertising in a media presentation stored on a digital medium, such as a Digital Video Disc (DVD).

BACKGROUND OF THE INVENTION

For video content such as television and movies, embedded advertising is quickly becoming an effective alternative to traditional commercial advertising. As used herein, "embedded advertisements" are advertisements such as images of advertised products or logos placed in scenes of a movie or television program where the video content is modified to include the advertised product or logo. For broadcast content such as television, the video content may be modified at the source to include embedded advertisements. For example, the Digital Brand Integration (DBI™) service provided by Marathon Ventures, http://marathonventures.com, enables product placement in video content such as episodes of television programs before the episodes are broadcast to viewers.

While embedding advertisements at the content source works well for broadcast video content, it is less than adequate to provide embedded advertisements in video content stored on read-only medium such as Digital Video Discs (DVDs). This is especially true if embedded advertisements relevant to the locality of the viewer are desired. Thus, there is a need for a system and method of providing embedded advertisements in a media presentation stored by read-only media such as a DVD where the embedded advertisements are relevant to the locality of the viewer.

SUMMARY OF THE INVENTION

The present invention relates to a system and method of providing a digital medium, such as a Digital Video Disc (DVD), enabling playback of different versions of a media presentation depending on the locality of the viewer, where each version includes embedded advertisements for a corresponding locality. In one embodiment, a DVD stores a media presentation such as, for example, a movie, an episode of a television program, or the like. Depending on the location of the viewer, the DVD provides a version of the media presentation having embedded advertisements relevant to the locality of the viewer.

More specifically, in one embodiment, the DVD stores a number of original video segments or cells forming all or a significant portion of an original version of the media presentation. The original version of the media presentation may not include any embedded advertisements. Alternatively, the original version of the media presentation may include one or more default embedded advertisements. In addition, for each of a number of defined localities, the DVD stores modified video segments corresponding to segments of the original version of the media presentation and including embedded advertisements relevant to the locality. The DVD also includes a number of coded Program Chains (PGCs). For each of the defined localities, a corresponding coded PGC defines a version of the media presentation for the locality from the original video segments and the modified video segments for the locality.

In operation, a PGC selection function of the DVD identifies one of the defined localities in which the viewer is located. Based on the identified locality, the PGC selection function selects the PGC for that locality and initiates playback of the media presentation. As such, the version of the media presentation including the modified video segments having embedded advertisements relevant to that locality is presented to the viewer.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
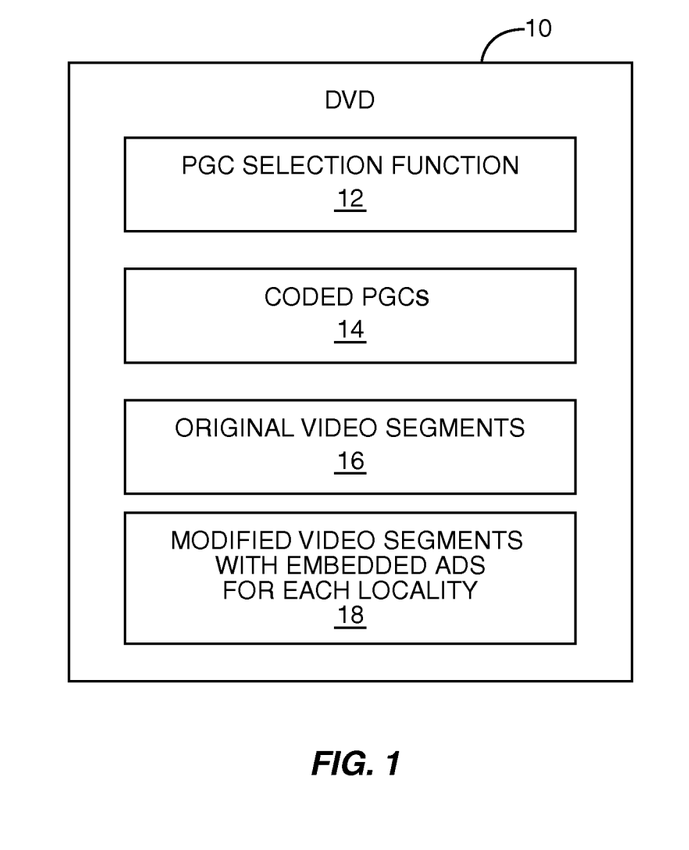
FIG. 1 illustrates an exemplary Digital Video Disc (DVD) according to one embodiment of the present invention.

FIG. 1 is a block diagram illustrating various components of a Digital Video Disc (DVD) 10 providing a media presentation such as a movie, television program, or the like according to one embodiment of the present invention. As used herein, "DVD" is to include traditional DVDs as well as Blu-ray and HD-DVD DVDs. Further, while the discussion herein focuses on DVDs, the present invention is not limited thereto. The present invention is equally applicable to any digital medium, such as any read-only medium, that stores a media presentation in a number of segments or cells and a set of identifiers, such as an array of pointers, is used to define the order in which the segments are presented to the user.

As illustrated, the DVD 10 includes a Program Chain (PGC) selection function 12, a number of coded PGCs 14 where each of the coded PGCs 14 generally corresponds to one of a number of defined localities, a number of original video segments, or cells, 16 forming an original version of a media presentation provided by the DVD 10, and a number of modified video segments, or cells, 18 having embedded advertisements for each of a number of localities. As discussed below, together, the original video segments 16 and the modified video segments 18 are used to provide versions of the media presentation including locality relevant advertisements embedded therein.

The PGC selection function 12 generally operates to identify one of a number of predetermined localities in which a viewer of the DVD 10 is located and to select a corresponding one of the coded PGCs 14 to be used for playback. The predetermined localities may be, for example, states within the United States; geographic regions within the United States and/or other country(s); geographic regions of the United States and/or other country(s) defined by time zones, zip codes, or area codes; or the like. The locality of the viewer may be stored by a media playback device playing the DVD 10 such as a DVD player, personal computer equipped with a DVD drive, or the like. For example, the locality, or more specifically a code identifying the locality, may be stored in the internal registers of a DVD player such as reserved register fields SPRM 21 or 23.

The PGC selection function 12 may be implemented using any known technique such as, for example, software or instructions providing a menu such as those used to select a title for playback on traditional DVDs. In operation, the PGC selection function 12 may identify the locality in which the viewer is located by presenting a menu to the viewer via a device or system playing the DVD 10, where the menu enables the viewer to select the viewer's locality, enter or select the viewer's zip code or area code, enter or select the country, state, and/or city in which the viewer is located, or the like. For example, the viewer may be presented with a map of the United States and be asked to select the state in which he is located. As an alternative, the PGC selection function 12 may instruct a device or system playing the DVD 10 to obtain the device's or system's location from, for example, an associated Global Positioning System (GPS) receiver, a base station in a cellular network, an associated Internet Service Provider (ISP), or the like.

The coded PGCs 14 include a PGC for each of the predetermined localities. In addition, as discussed below, the coded PGCs 14 may also include a default PGC to be used when the locality of the viewer is unknown. In general, each of the coded PGCs 14 is an array of pointers to ones of the video segments 16 and 18 that defines a version of the media presentation for the corresponding locality. Note that while the array of pointers is discussed herein, the present invention is not limited thereto. More specifically, a set of identifiers identifying the ones of the video segments 16 and 18 forming the version of the media presentation for the corresponding locality may be used, where the set of identifiers may be an array of pointers or an array of identifiers of the segments.

In one embodiment, the original video segments 16 include a number of video segments forming the original version of the media presentation provided by the DVD 10 without embedded advertisements. Alternatively, the original video segments 16 may include only the segments of the media presentation that are needed in light of the modified video segments 18. For example, if a particular segment of the original version of the media presentation is replaced in all of the coded PGCs 14, then that segment of the original media presentation may not be stored on the DVD 10 as one of the original video segments 16. As another alternative, the original video segments 16 may include a number of video segments forming an original or default version of the media presentation having default advertisements embedded therein. The default advertisements may be, for example, advertisements for international or national products or businesses such as Coca-Cola®, Nike®, Motorola®, and the like.

For each of the predetermined localities, the modified video segments 18 include one or more segments of the media presentation having advertisements relevant to the corresponding locality embedded therein. As used herein, "embedded" advertisements refer to advertisements embedded in the actual media content. In one embodiment, embedded advertisements may be, for example, images of advertised products or logos embedded in one or more scenes of a movie or television program such that it appears as though the advertised products appeared in the original scenes of the movie or television program. Thus, in this embodiment, the advertisements may be embedded into the segments as overlays. For example, a segment may be modified to include a can of Coca-Cola® or a box of a local brand of cereal on a table appearing in a particular scene or scenes or to place a shopping bag from a local department store within a particular scene. As another example, a logo or other advertisement may be embedded into a segment by overlaying the advertisement on the side of a truck or bus, on a billboard sign appearing in a scene, or the like.

In another embodiment, the modified video segments 18 may be alternative scenes filmed with different products or logos appearing in the scene. For example, a particular scene may be filmed once for the first locality such that a product or other advertisement relevant to the first locality appears in the scene. The same scene may be re-filmed for each of the other localities such that products or other advertisements relevant to those localities appear in the scene. Thus, in this embodiment, the embedded advertisements are the actual products or advertisements placed in the alternative filmed versions of the scene.

Figure 2:
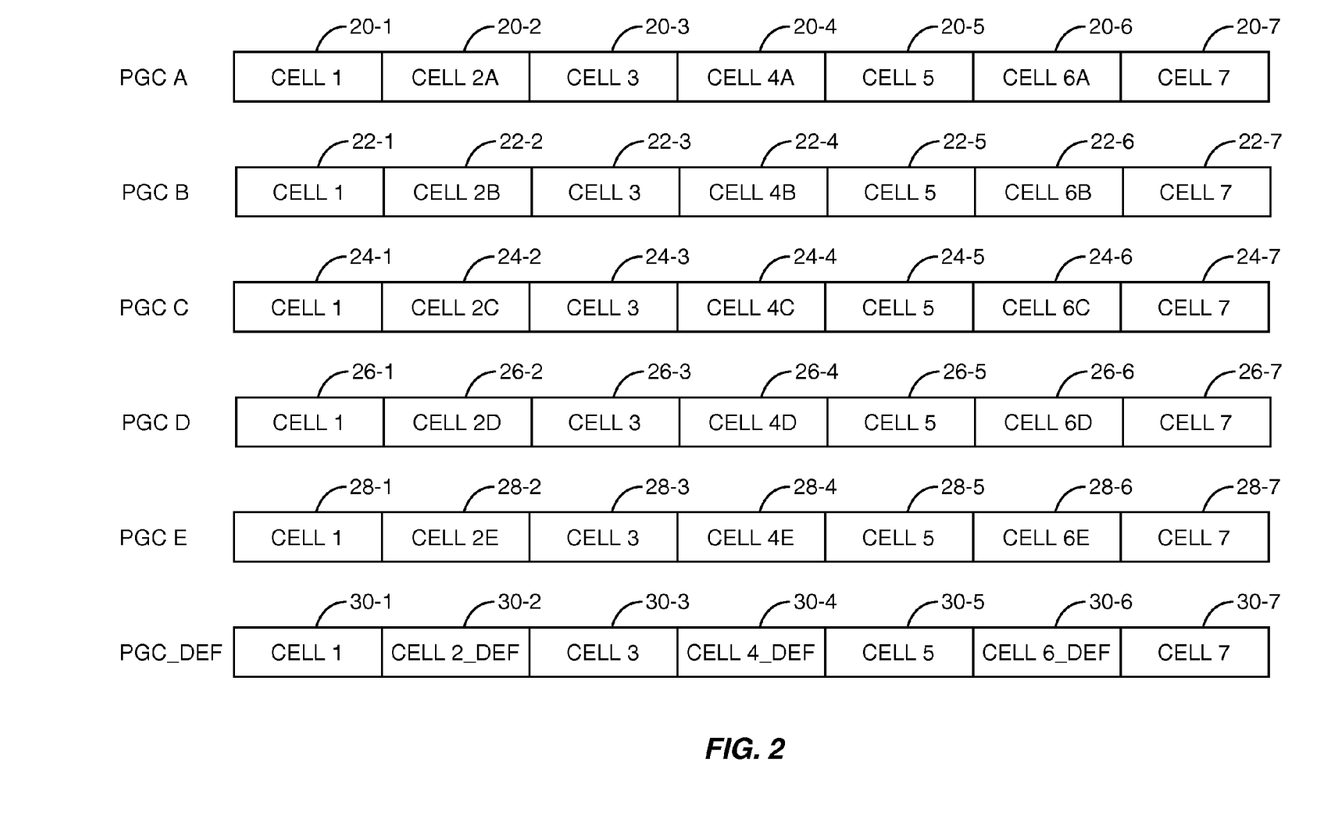
FIG. 2 illustrates a number of coded Program Chains (PGCs) stored on the DVD, where each of the coded PGCs corresponds to a particular locality according to one embodiment of the present invention.

FIG. 2 illustrates the coded PGCs 14 according to one embodiment of the present invention. In this example, there are six coded PGCs 14: PGC_A through PGC_E and PGC_DEF. However, there may be any number of coded PGCs 14. Each of the PGCs PGC_A through PGCE corresponds to a particular locality. PGC_DEF is an optional default PGC to be used when, for example, the locality of a viewer cannot be determined or is otherwise unknown. The video segments 16 associated with the default PGC (PGC_DEF) may have embedded advertisements for international or nationwide products or businesses such as Coca-Cola®, Nike®, and Motorola®.

In this example, PGC_A is associated with a locality A. The locality A may be, for example, one of the 50 states in the United States of America, one of a number of geographic regions in the United States such as the Northeast, Midwest, South, and West regions of the United States, or the like. PGC_A includes pointers 20-1 through 20-7. Together, the pointers 20-1 through 20-7 identify ones of the segments 16 and 18 and an ordering of the ones of the segments 16 and 18 forming a version of the media presentation including embedded advertisements relevant to the locality A.

More specifically, in this example, the pointer 20-1 is a pointer to one of the original segments 16 (Cell 1), where Cell 1 is an original version of a first segment of the media presentation. The pointer 20-2 is a pointer to one of the modified segments 18 (Cell 2A), where Cell 2A is a modified version of a second segment of the media presentation including an advertisement for the locality A embedded therein. The pointer 20-3 is a pointer to one of the original segments 16 (Cell 3), where Cell 3 is an original version of a third segment of the media presentation. The pointer 20-4 is a pointer to one of the modified segments 18 (Cell 4A), where Cell 4A is a modified version of a fourth segment of the media presentation including an advertisement for the locality A embedded therein. The pointer 20-5 is a pointer to one of the original segments 16 (Cell 5), where Cell 5 is an original version of a fifth segment of the media presentation. The pointer 20-6 is a pointer to one of the modified segments 18 (Cell 6A), where Cell 6A is a modified version of a sixth segment of the media presentation including an advertisement for the locality A embedded therein. The pointer 20-7 is a pointer to one of the original segments 16 (Cell 7), where Cell 7 is an original version of a seventh segment of the media presentation. Together, the video segments Cell 1, Cell 2A, Cell 3, Cell 4A, Cell 5, Cell 6A, and Cell 7 identified by the pointers 20-1 through 20-7 of PGC_A form the version of the media presentation provided by the DVD 10 having embedded advertisements relevant to the locality A.

In a similar fashion, pointers 22-1 through 22-7 identify video segments Cell 1, Cell 2B, Cell 3, Cell 4B, Cell 5, Cell 6B, and Cell 7 forming a version of the media presentation having embedded advertisements relevant to locality B. Pointers 24-1 through 24-7 identify video segments Cell 1, Cell 2C, Cell 3, Cell 4C, Cell 5, Cell 6C, and Cell 7 forming a version of the media presentation having embedded advertisements relevant to locality C. Pointers 26-1 through 26-7 identify video segments Cell 1, Cell 2D, Cell 3, Cell 4D, Cell 5, Cell 6D, and Cell 7 forming a version of the media presentation having embedded advertisements relevant to locality D. Pointers 28-1 through 28-7 identify video segments Cell 1, Cell 2E, Cell 3, Cell 4E, Cell 5, Cell 6E, and Cell 7 forming a version of the media presentation having embedded advertisements relevant to locality E. Pointers 30-1 through 30-7 identify video segments Cell 1, Cell 2 DEF, Cell 3, Cell 4 DEF, Cell 5, Cell 6 DEF, and Cell 7 forming a version of the media presentation having default advertisements embedded therein. The default advertisements may be advertisements of, for example, international or national products or services.

It should be noted that in an alternative embodiment, rather than including the default PGC (PGC_DEF) and associated video segments including the default advertisements, the original segments 16 may alternatively include the default advertisements embedded therein.

It should also be noted that while the coded PGCs 14 (PGC_A through PGC_E and PGC_DEF) of FIG. 2 each include the same number of modified segments 18 and include the modified segments 18 in the same positions in the media presentation, the present invention is not limited thereto. More specifically, while each of the PGCs (PGC_A through PGC_E and PGC_DEF) are illustrated as including three modified segments 18 including locality-relevant advertisements, the PGCs (PGC_A through PGC_E and PGC_DEF) may each include any number of modified segments 18.

Further, while each of the PGCs (PGC_A through PGC_E and PGC_DEF) is illustrated as replacing Cells 2, 4, and 6 with corresponding modified segments 18, the present invention is not limited thereto. Thus, each of the coded PGCs 14 is independent of the others and may include any number of modified segments 18 in any desired cell position.

Figure 3:
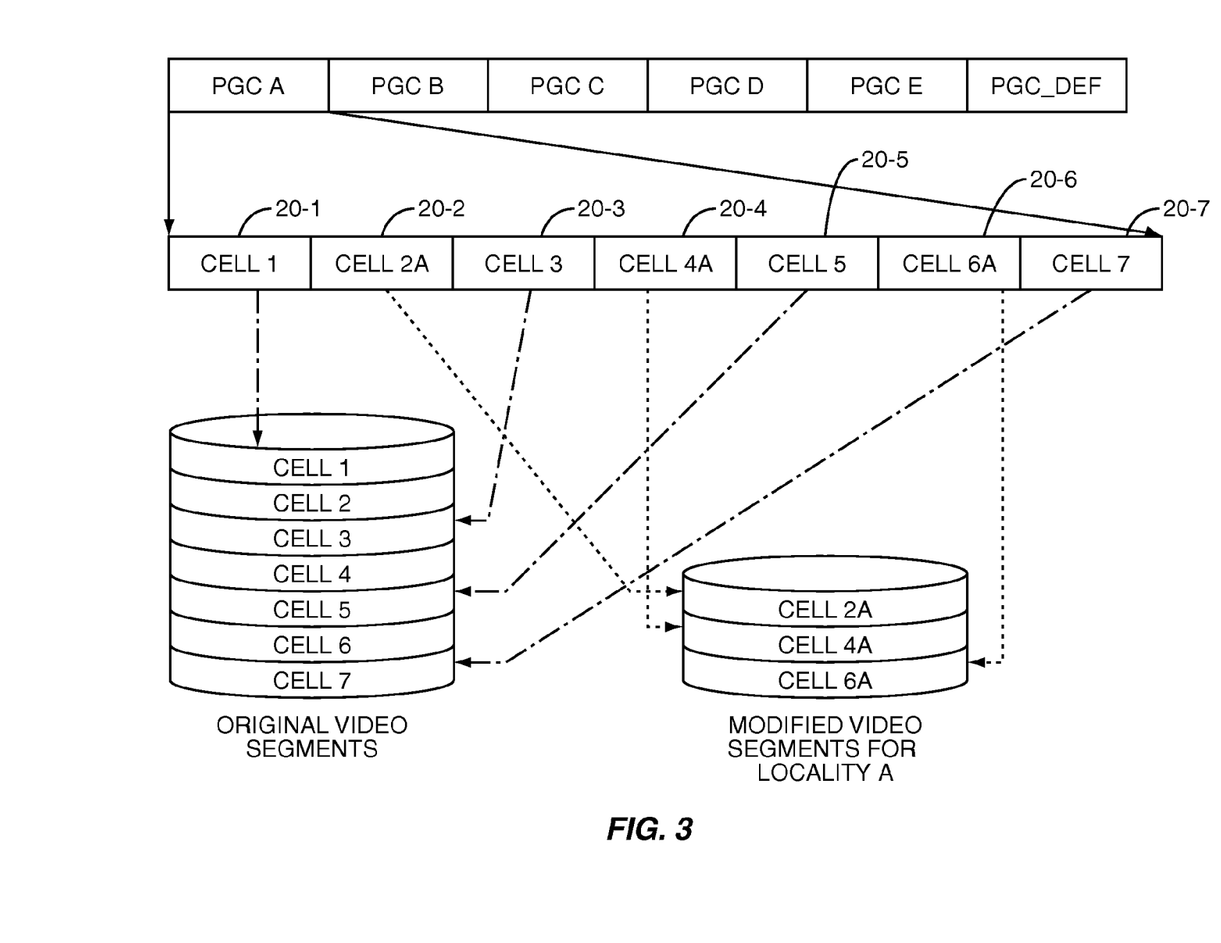
FIG. 3 illustrates the operation of the pointers within one of the coded PGCs of FIG. 2 according to one embodiment of the present invention.

FIG. 3 is another illustration of the coded PGCs 14. More specifically, FIG. 3 illustrates the operation of the pointers 20-1 through 20-7 of PGC_A. Note that the pointers in the other PGCs (PGC_B through PGC_E and PGC_DEF) operate in a similar fashion. As illustrated, PGC_A includes the array of pointers 20-1 through 20-7. The pointers 20-1, 20-3, 20-5, and 20-7 point to corresponding ones of the original video segments 16 stored on the DVD 10. Likewise, the pointers 20-2, 20-4, and 20-6 point to corresponding ones of the modified segments for the locality A, which are also stored on the DVD 10. When combined in the order defined by the array of pointers 20-1 through 20-7, the segments Cell 1, Cell 2A, Cell 3, Cell 4A, Cell 5, Cell 6A, and Cell 7 form the version of the media presentation including the embedded advertisements for the locality A.

Figure 4:
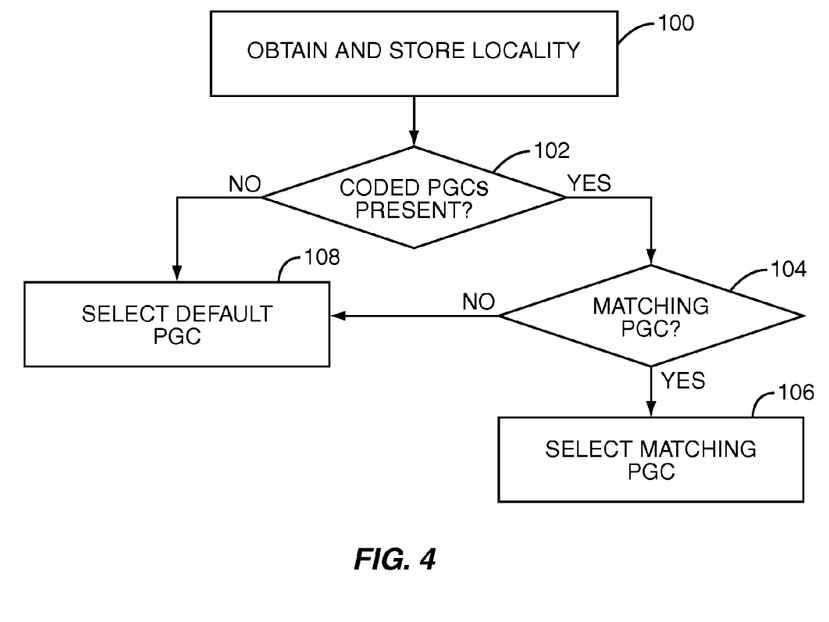
FIG. 4 illustrates the operation of the PGC selection function of the DVD of FIG. 1 according to one embodiment of the present invention.

FIG. 4 illustrates the operation of the PGC selection function 12 of FIG. 1 according to one embodiment of the present invention. First, upon being loaded by a device such as a DVD player or personal computer equipped with a DVD drive, the PGC selection function 12 obtains and stores the locality in which the viewer is located (step 100). The locality of the viewer is generally the locality of the device loading and playing the DVD 10. As discussed above, the PGC selection function 12 operates to select the locality of the viewer from a number of predetermined or predefined localities, where each of the localities is associated with a corresponding one of the coded PGCs 14. The PGC selection function 12 may obtain the locality by enabling the viewer to select his locality from the number of predetermined localities using a menu. As will be apparent to one of ordinary skill in the art, the menu may be provided according to the DVD specification which is available at http://www.dvdfllc.co.jp. In another embodiment, the PGC selection function 12 may include software or computer readable code that instructs the device playing the DVD 10 to obtain a location of the device and determine the locality of the device based thereon. The location of the device may be obtained from an associated GPS receiver, an ISP to which the device has a network connection, a cellular base station where the device has a cellular network connection, or the like. As another alternative, if the device has a dial-up modem, the area code of the telephone number dialed by the dial-up modem may be used as the locality or used to determine the locality. One of ordinary skill in the art will appreciate that other methods for obtaining or determining the locality of the viewer may be used and are to be considered within the scope of the present invention. Once the locality is obtained, the locality or a code identifying the locality may be stored by the device and accessed by the PGC selection function 12. For example, if the device is a DVD player, the code identifying the locality may be stored in reserved register fields SPRM 21 or 23.

Next, PGC selection function 12 determines whether the coded PGCs 14 are present on the DVD 10 (step 102). Step 102 is optional. The PGC selection function 12 may alternatively assume that the coded PGCs 14 are present on the DVD 10. If the coded PGCs 14 are present, the PGC selection function 12 then determines whether any one of the coded PGCs 14 matches the locality of the viewer (step 104). Step 104 may also be optional. For example, if the PGC selection function 12 presents a menu to the viewer, the menu may be provided such that the viewer is forced to select one of the predetermined localities, the default version of the media presentation, or optionally the original version of the media presentation including no embedded advertisements.

If there is a matching PGC, the PGC selection function 12 selects the one of the coded PGCs 14 matching the locality of the viewer to be used for playback (step 106). The selected PGC is then used to present to the viewer the version of the media presentation having embedded advertisements for the locality of the viewer.

Returning to steps 102 and 104, if the coded PGCs 14 are not present or if none of the coded PGCs 14 match the locality of the viewer, the PGC selection function 12 selects the default PGC (step 108). The default PGC is then used to present the default version of the media presentation to the viewer.

Figure 5:
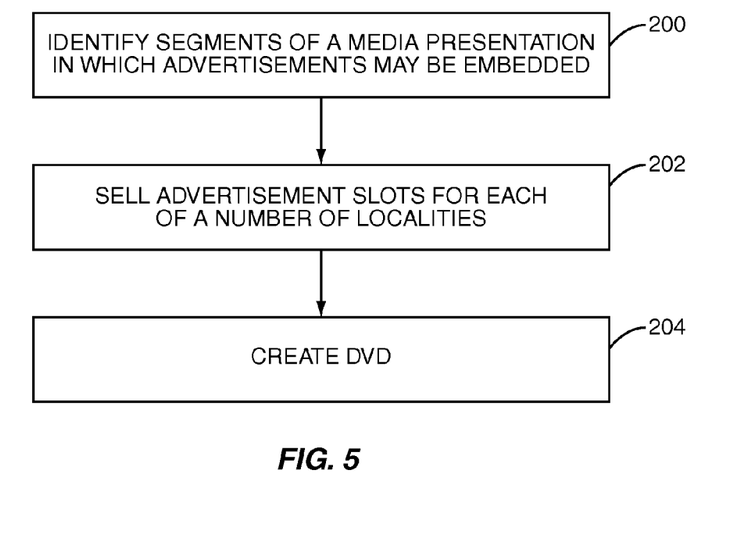
FIG. 5 illustrates an exemplary process for producing the DVD of FIG. 1 according to one embodiment of the present invention.

FIG. 5 illustrates an exemplary process for creating the DVD 10 of the present invention. First, a producer or manufacturer of the DVD 10 or the media presentation to be stored on the DVD 10 identifies segments of the media presentation that may be used for embedding advertisements (step 200). Advertisement slots are then sold to advertisers for each of a number localities (step 202). The DVD 10 is then created (step 204). More specifically, the original segments 16 of the media presentation are produced or otherwise provided. For each locality, the advertisements are embedded into or overlaid upon corresponding segments of the media presentation to provide the modified segments 18 of the media presentation including the embedded advertisements for each locality. The modified segments 18 may be generated from the original segments 16. The coded PGCs 14 are created to define the versions of the media presentations for each of the localities. The PGC selection function 12, the coded PGCs 14, the original segments 16, and the modified segments 18 are then stored on the DVD 10.

The present invention provides substantial benefits over traditional DVDs. More specifically, the DVD 10 of the present invention enables viewers in different locations to view versions of a media presentation having locality-relevant advertisements embedded therein. Thus, for example, the version of the media presentation presented to a viewer in California may include a scene where an embedded advertisement for Mervyns, which is a department store chain based in Hayward, Calif., is embedded in a scene in the form of a shopping bag having the Mervyns logo. In contrast, the version of the media presentation presented to a viewer in Raleigh, N.C. may include an embedded advertisement for Dillard's, which is a chain of department stores primarily located in the South, is embedded in the same scene in the form of a shopping bag having the Dillard's logo. Similarly, viewers in London, U.K. may be presented with a version of the media presentation having advertisements relevant to the London area embedded therein.

Further, while the present invention is described herein as pertaining to embedded advertisements, the present invention is not limited thereto. For example, in addition or alternatively, the modified segments 18 and the coded PGCs 14 may be used to provide different versions of the media presentation for other purposes. For example, different versions of the media presentation may be desired for users in various localities for purposes other than embedded advertisements. As another example, the present invention may be used to provide a parental control feature. If the viewer is a child or underage viewer, the present invention may enable alternative scenes for children or underage viewers. For example an explict scene in an R-rated movie may be replaced with an alternative version of the scene that is more appropriate for underage viewers. Still further, the present invention may allow such scenes to be deleted from the version of the media presentation for underage viewers. The above examples are not intended to be an exhaustive list of uses for the present invention. Other uses will be apparent to one of ordinary skill in the art upon reading this disclosure.

Those skilled in the art will recognize improvements and modifications to the preferred embodiments of the present invention. All such improvements and modifications are considered within the scope of the concepts disclosed herein and the claims that follow.

What is claimed is:

1. A method for presenting a version of a media presentation contained on a non-transitory digital medium, the digital medium including original video segments that form at least a portion of an original version of the media presentation, first modified video segments that correspond to video segments of the original version of the media presentation and that have embedded content for a first locality, and a first set of identifiers that defines a first version of the media presentation for the first locality formed by the first modified video segments and at least certain ones of the original video segments, the method comprising:

determining, by a media playback device, a locality;

selecting, by the media playback device, the first set of identifiers if the locality is the first locality such that the first version of the media presentation includes the first modified video segments that have embedded content for the first locality in place of the corresponding video segments of the original version; and presenting the first version of the media presentation to a viewer.

2. The method of claim 1 wherein the digital medium further includes second modified video segments that correspond to the video segments of the original version of the media presentation and that have embedded content for a second locality, and a second set of identifiers that defines a second version of the media presentation for the second locality formed by the second modified video segments and the at least certain ones of the original video segments, the method further comprising selecting the second set of identifiers if the locality is the second locality such that the second version of the media presentation includes the second modified video segments that have the embedded content for the second locality in place of the corresponding video segments of the original version.

3. The method of claim 2 wherein the digital medium is a Digital Video Disc (DVD) and the first and second sets of identifiers are arrays of pointers.

4. The method of claim 2 wherein the original video segments comprise all video segments of the original version of the media presentation, the first set of identifiers defines the first version of the media presentation such that the first modified video segments replace the corresponding video segments of the original version, and the second set of identifiers defines the second version of the media presentation such that the second modified video segments replace the corresponding video segments of the original version.

5. The method of claim 1 wherein determining the locality comprises receiving input from the viewer that identifies the locality.

6. The method of claim 1 wherein determining the locality comprises determining the locality based on an Internet Protocol (IP) address associated with the media playback device.

7. The method of claim 1 wherein the media playback device comprises a GPS receiver, and wherein determining the locality comprises determining the locality based on a location of the media playback device that is determined via the GPS receiver.

8. The method of claim 1, wherein the embedded content in the first modified video segments comprises an advertisement.

9. The method of claim 1, wherein the embedded content in the first modified video segments comprises a logo.

10. The method of claim 1, wherein the embedded content in the first modified video segments comprises an alternate scene that differs from a scene depicted in the corresponding video segments of the original version.

11. A media playback device, comprising:

a processor configured to present a version of a media presentation contained on a non-transitory digital medium, the digital medium including original video segments that form at least a portion of an original version of the media presentation, first modified video segments that correspond to video segments of the original version of the media presentation and that have embedded content for a first locality, and a first set of identifiers that defines a first version of the media presentation for the first locality formed by the first modified video segments and at least certain ones of the original video segments, the processor further configured to:

determine a locality;

select the first set of identifiers if the locality is the first locality such that the first version of the media presentation includes the first modified video segments that have embedded content for the first locality in place of the corresponding video segments of the original version; and present the first version of the media presentation to a viewer.

12. The media playback device of claim 11, wherein to determine the locality, the processor is configured to receive input from the viewer that identifies the locality.

13. The media playback device of claim 11, wherein to determine the locality, the processor is configured to determine the locality based on an Internet Protocol (IP) address associated with the media playback device.

14. The media playback device of claim 11, wherein the media playback device further comprises a GPS receiver, and wherein to determine the locality, the processor is configured to determine the locality based on a location of the media playback device that is determined via the GPS receiver.

15. The media playback device of claim 11, wherein the embedded content in the first modified video segments comprises an advertisement.

16. The media playback device of claim 11, wherein the embedded content in the first modified video segments comprises a logo.

17. The media playback device of claim 11, wherein the embedded content in the first modified video segments comprises an alternate scene that differs from a scene depicted in the corresponding video segments of the original version.

* * * * *